F. N. DU BOIS.

Machine for Manufacturing Lead Traps.

No. 9,649. Reissued April 12, 1881.

Witnesses.
Anton Ruppert.
J. E. Mason

F. N. Du Bois
Inventor:
by
R. Mason
Atty

UNITED STATES PATENT OFFICE.

FREDERICK N. DU BOIS, OF NEW YORK, N. Y.

MACHINE FOR MANUFACTURING LEAD TRAPS.

SPECIFICATION forming part of Reissued Letters Patent No. 9,649, dated April 12, 1881.

Original No. 167,076, dated August 24, 1875. Application for reissue filed April 6, 1880.

*To all whom it may concern:*

Be it known that I, FREDK. N. DU BOIS, of the city, county, and State of New York, have invented a new and useful Improvement on a Process and Machine for Making Plumbers' Lead Traps; and I do hereby declare that the following is a full, clear, and exact description of the construction and operation of the same, reference being had to the annexed drawings, making a part of this specification.

The nature of my improvement consists in making lead traps in their finished state substantially in the same general manner that lead pipe is made, by means of very strong cylinders for holding the lead and powerful hydraulic pressure for forcing it out through an orifice having the shape of the pipe required, but with this essential difference, that in making ordinary lead pipe the lead is supplied in equal amount to all parts of the orifice at the same time, and the pipe comes out straight, while, to make lead traps by this improvement, the lead is furnished in greater quantity, first on one side of the orifice and then on the other, as it may be desired to make the pipe or trap bend either way.

To enable others skilled in the art to make and use my invention, I will proceed to describe its construction and operation in detail.

Figure 1:
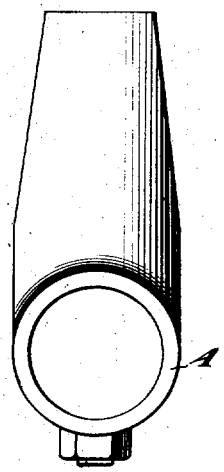
Figure 2:
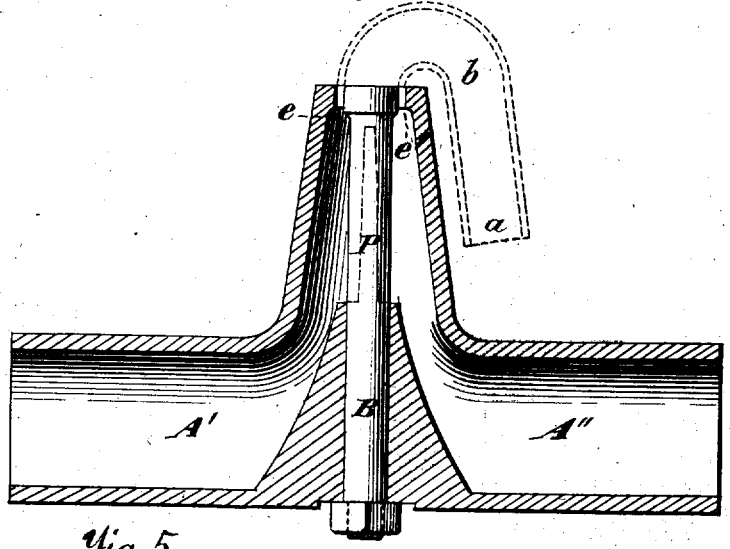
Figure 5:
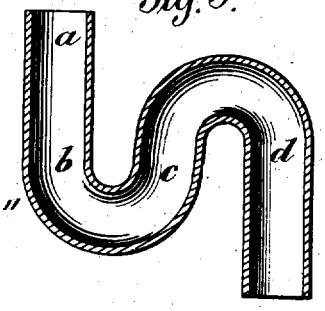
Figure 3:
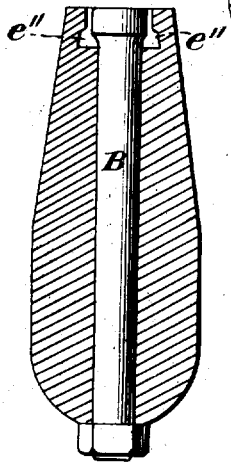
Figure 4:
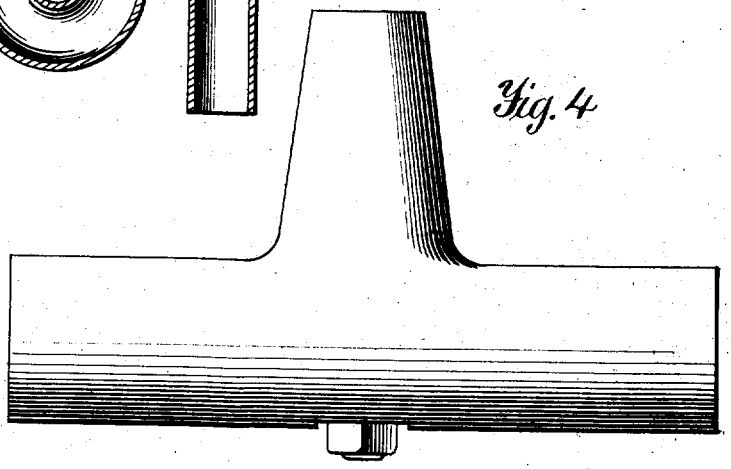

Figure 1 is an end elevation of what may be called the "cylinder," and which is to be a thick casting of steel of great strength. Fig. 2 is a sectional longitudinal elevation of the same. Fig. 3 is a cross-section. Fig. 4 is an elevation. Fig. 5 is a sectional elevation of a trap in its finished state.

The same letters refer to corresponding parts in the different figures.

The method of operating the machine is as follows: The steel cylinder Fig. 2, of which there must be one for each size of trap to be made, is held in a fixed horizontal position, as represented in the drawings, by suitable fastenings. It is then heated by any convenient means to about 400°. The ends A′ and A″ are now filled with melted lead, which is allowed to cool until the heat is a little below the melting-point, when a plunger or ram (not necessarily shown in the drawings) attached to a hydraulic water-cylinder is brought against the lead in each end. The force exerted by one, which will be from twenty thousand to thirty thousand pounds per square inch on the surface of the lead, is counterbalanced by the other, and drives the lead into and fills the two upward passages to the circular orifice *e* and *e′*, Figs. 2 and 3. These two streams of hot and soft, but not melted, lead are kept separate from each other until they arrive near the orifice by the steel core B, Figs. 2 and 3, which has a nut on the bottom to prevent its being forced upward, and a projection around the top, which forms the inside of the orifice; also by the partition P, (shown by the dotted lines in Fig. 2, and the top of which is shown at *e″* and *e″*, Fig. 3.) These two partitions are a part of the steel casting, and extend to and fit close against the core on its opposite sides, and complete the separation of the two streams of lead until it is desired to unite them just below the orifice.

By a suitable arrangement of the hydraulic machinery in common use in the manufacture of lead pipe the two rams, which fit closely in the ends of the cylinder, Fig. 2, and which force forward the lead, are under easy control of the person operating the machine.

The operation of forming a trap such as is represented at Fig. 5 is to move forward the two streams of lead with equal speed, and supplying an equal amount of lead to all parts of the orifice, when the lead will be forced out through it, forming a round smooth pipe that will be straight, the soft, hot, and clean lead of the two streams having united inseparably in the space between the top of the partition and the orifice under a pressure varying with different degrees of heat from fourteen thousand to eighteen thousand pounds per square inch. The part of the trap now formed is represented from *a* to *b* in Fig. 5, and by the dotted lines at the top of Fig. 2, each stream having furnished lead for half of the circumference of the pipe. The speed of the right-hand stream A″ is now reduced and the speed of the left-hand stream increased, the effect of which is that the side of the orifice at *e′* is supplied with only enough lead to form the short side of a curved pipe, while the other side of the orifice, at *e*, is supplied with enough lead to form the long side of the curved pipe and a little more than half of the circumference, the lines of union between the two streams of lead moving toward the side that supplies the least lead. Hence the pipe is formed by a natural and easy distribution of the metal, and is free from waves or imperfections. The curve being thus formed from *b* to *c*, the order of speed of the two streams of lead is now reversed, when the same effect takes place in the opposite direction, forming the pipe or trap from *c* to *d*, after which the speed of both streams is again made equal, when a straight part is formed, as at first, and which is sawed off at the orifice, a finished lead trap without a seam and of equal thickness in all its parts.

The operation above described is repeated until the lead in the cylinder is exhausted, when the rams are withdrawn and more lead introduced, as at first.

In Cunningham's patent, No. 139,946, issued June 17, A. D. 1873, there is shown a "device to be attached to the reservoir holding the hot lead or composition to be forced through the die by any suitable power." The core in that case is represented as supported within the external shell by wings, which will divide the stream of lead as it enters what he calls the "die," and below the movable diaphragm, which is intended, as set forth in his specification, to increase or diminish the quantity of lead or composition passing through the die on either side alternately, and so cause, as he asserts, the emerging trap to assume any desired curve. My invention is distinguished from that set forth in said Letters Patent in this, that the partitions P extend along the core, forming, with the shell, "the two upward passages," "and" (as set forth herein) "complete the separation of the two streams of lead until it is desired to unite them just below the orifice." This is done by the union of the passages in a short annular chamber at the base of the swell on the outer end of the core, whereas in said Cunningham's machine, as set forth in his patent, the lead flows along the entire length of the cylindrical core in an annular chamber in a single stream. The action in his machine is on a stream formed as a pipe between the shell and the core, and entirely surrounding the core, while in my machine the streams, moving at different velocities, are not united until they meet in the annular chamber, just before passing out at the orifice of discharge.

What I claim as my invention is—

1. As an improvement in the art of making lead traps for plumbers' use, the ejectment of two or more convergent streams of metal moving with unequal velocities through an annular orifice or die, substantially as herein shown and described.

2. The improved apparatus herein shown and described, combining in its construction independent cylinders A′ A″, a core, B, partitions P, and an annular discharge orifice, *e e′*, for forming traps by the union of independently-actuated streams of lead, substantially as set forth.

3. In a machine for making lead traps by controlling the efflux of the metal on opposite sides of a central core, in combination with the core and external shell which form the annular orifice, through which the metal is discharged in the form of a pipe, two passages through which streams of lead entering on opposite sides of the central core, and capable of being supplied in different quantities, will be united in an annular space just below the orifice of discharge, substantially as set forth.

In testimony whereof I have hereunto set my hand in presence of two subscribing witnesses.

FREDERICK N. DU BOIS.

In presence of—
GEO. F. GRAHAM,
R. MASON.